May 28, 1957     U. J. CHILDS     2,793,446

SCORING SYSTEM

Filed June 29, 1953     2 Sheets-Sheet 1

INVENTOR.
ULRIC J. CHILDS

May 28, 1957
U. J. CHILDS
2,793,446
SCORING SYSTEM
Filed June 29, 1953
2 Sheets-Sheet 2
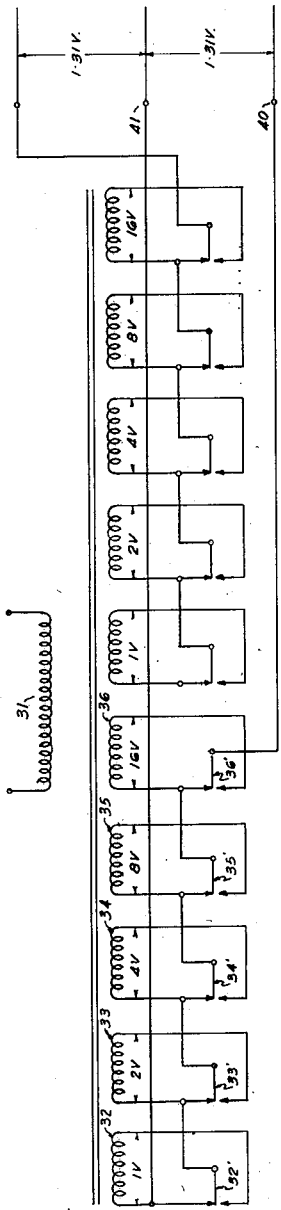
INVENTOR.
ULRIC J. CHILDS

United States Patent Office 2,793,446
Patented May 28, 1957

2,793,446

SCORING SYSTEM

Ulric J. Childs, New York, N. Y., assignor to Peerless Instrument Co., Inc., Elmhurst, N. Y., a corporation of New York Application June 29, 1953, Serial No. 364,841

3 Claims. (Cl. 35—48)

This invention relates to scoring apparatus for classroom or group use and more particularly to such apparatus for quickly and accurately determining and counting the number of correct answers from each of a group.

The invention is particularly adapted for use in classroom work where it is generally quite time consuming to conduct a quiz or examination and is even more time consuming to mark the papers fairly and accurately. The scoring system of the invention may also be used in many other applications for instance, in a legislature assembly, games of chance, bingo, etc.

The present invention, in brief, provides a master or instructor's station and a number of remote or student stations. Means are provided for the instructor to insert the correct answer when he asks a question by pushing the proper combination of push button switches. Means are provided at the students' location whereby they may insert their answer by pushing the proper combination of push button switches. The correct answer from the instructor is comptred with each student's answer in a separate difference amplifier. The difference amplifier output relay is normally unenergized, and remains so when instructor's and student's voltage are in agreement. Counter will then operate upon closing of scoring contact S by instructor. If answers are not in agreement, the difference relay is actuated opening its contacts and thereby breaking the circuit to the counter. Closing of contact S will then not operate respective counter.

More particularly, the answers are inserted by adding a series of voltages and the correct voltage from the instructor and the student's answer voltage are connected in bucking relation from an input transformer of the difference amplifier.

If the student's answer is correct, there will be no net voltage to the amplifier. If the student's answer is incorrect, the difference voltage will be amplified by the difference amplifier to actuate a relay which will open that student's counter circuit thereby making counter inoperative.

Accordingly, a principal object of the invention is to provide new and improved scoring means.

Another object of the present invention is to provide new and improved scoring and tabulating means.

Another object of the present invention is to provide scoring and tabulating means whereby the incorrect answers of a number of possibilities from a number of participants may be quickly and accurately determined.

Another object of the present invention is to provide scoring and tabulating means comprising master station correct answer input means, a plurality of participants input means, means to compare the correct answer with that of each of the participants and means to tabulate or count the correct answers of each participant.

Another object of the present invention is to provide new and improved scoring system.

These and other objects of the invention will be apparent from the following specification and drawings of which:

Figure 2 is a schematic diagram of the push button-selector switch used in the embodiment of Figure 1.

Figure 3 is a schematic diagram showing the difference amplifiers used in the embodiment of Figure 1.

Figure 1:
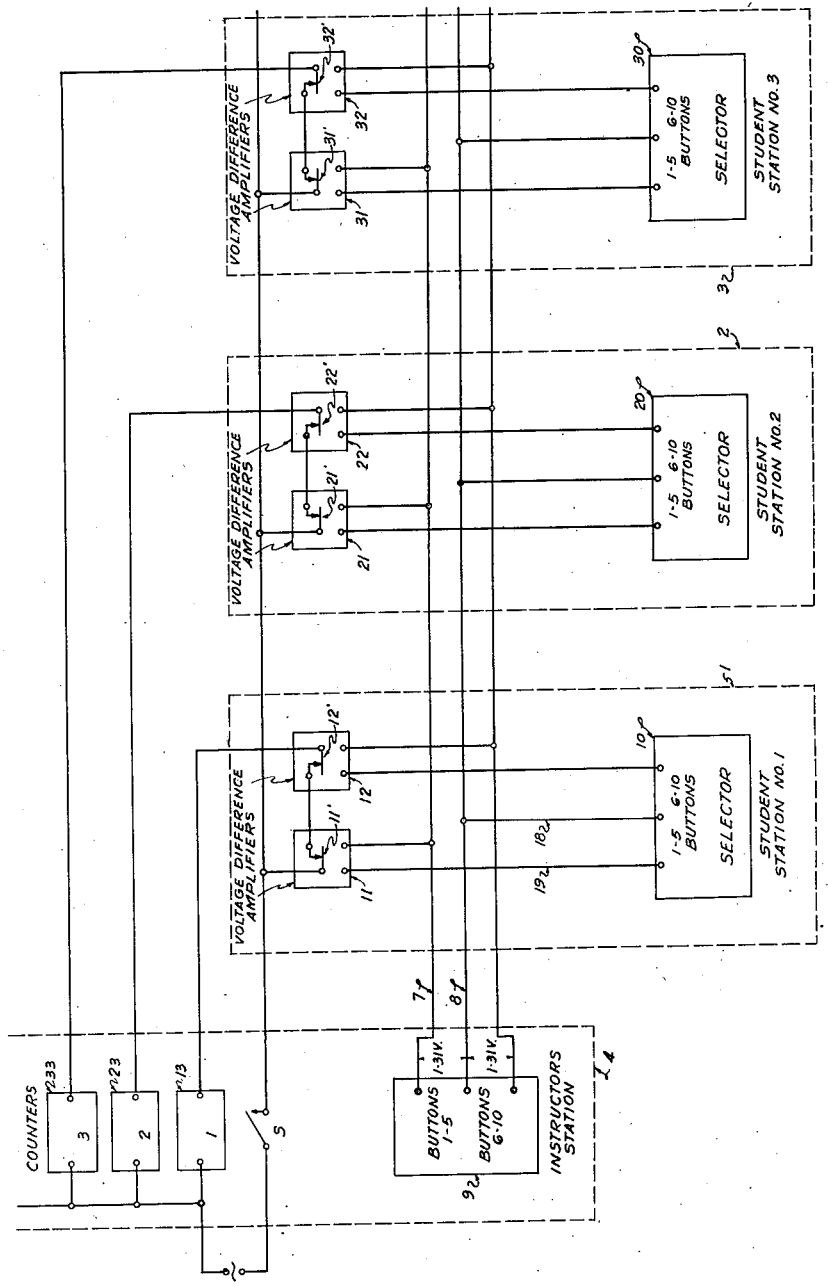
Figure 1 is a schematic block diagram of an embodiment of the scoring system.

Figure 1 shows an embodiment of the invention which comprises generally, a master or instructor's station 4 and a plurality of remote or student stations 1, 2 and 3. Each station has a push button selector as master selector 9 and remote selectors 10, 20 and 30.

A schematic diagram of a typical selector is shown in Figure 2. Each selector comprises a transformer having primary winding 31 and a plurality of secondary windings 32 to 36. The secondary windings are adapted to be connected in series by push button switches 32' to 36'. The voltages on the secondary windings having difference ratio as noted in Figure 2, namely 1:2:4:8:16, thereby providing means to provide on the output terminals 40 and 41, any voltage from 1 to 31 volts. There are two sets of secondaries in each selector and each section provides a voltage from 1 to 31.

Any one voltage from 1–31 can be selected by one and only one combination of buttons. Any number of sets of secondaries are possible. Also voltage series can be extended to 1:2:4:8:16:32, for instance giving 1–64 volts.

Each student's remote station comprises a selector 10, 20, 30 of the type such as shown in Figure 2 and a pair of voltage difference amplifiers 11, 12, 21, 22, 31, 32, etc. There is one voltage difference amplifier for each set of secondaries. The relay contacts are always connected in series. The outputs of the master selector and each student's selector are fed in bucking relation to the respective difference amplifiers 11, 12, etc. Two outputs of 1–31 volts are provided, however, additional outputs may be added if desired.

If the student's answer is incorrect, the difference amplifier will open the respective relays 11', 12' which will open the circuit to the respective counters 13, 23, 33, etc. and the counter will not be actuated. The counters may be of the step relay type which advance each time the counter circuits are energized. The difference amplifier will be explained more fully in connection with Figure 3.

The operation of the system of Figure 1 is as follows:

The instructor asks a question and then inserts the correct answer. Assume the correct answer is 14. This is inserted by pressing the buttons 35', 34', and 33', corresponding to 8+4+2=14 volts. This applies a voltage of 14 volts from master selector 9 to leads 7 and 8. Assume student #1 inserts an incorrect answer of 12 on selector 10. This will apply a voltage of 12 volts on leads 18 and 19. The outputs of the master selector 9 and the student's selector 10 are series connected in bucking relation to the input of difference amplifier 11 so that the difference voltage of 14−12=2 volts is applied to the difference amplifier. This error voltage input will open the relay 11', thereby breaking the circuit to counter 13 so that when the instructor presses the tabulating key S the counter will not be actuated.

The answers of all the other students will be simultaneously and automatically evaluated and tabulated at the same time as the preceding operations, i. e. when the instructor presses the tabulating key S.

Figure 3 shows a schematic diagram of a difference amplifier for use in the embodiment of Figure 1. The outputs of a master selector 9 and student selector 10 are connected in series in opposite polarity to the input transformer 40 of the difference amplifier. Therefore, if the student's answer is incorrect, a difference voltage will appear on the secondary of the transformer 40 and will be applied to the grid 41 of amplifier tube 42. The output on the plate of amplifier tube 42 is fed through coupling condenser 43 and rectified by diode rectifier 44. The rectified output is applied to the grid 45 of amplifier tube 46.

The resistor network preceding the rectifier tube 44 is adapted to provide a D. C. bias of for instance, approximately 4½ volts to the cathode of the rectifier 44. The bias voltage is generated by connecting the plate voltage across resistors 50, 51 and 52 to the plate of the rectifier. Due to the voltage divider action and the chosen values of the resistors, a voltage of approximately 4½ volts will appear at the junction of resistors 51 and 52 whence it is connected by a resistor 53 to the cathode of the rectifier tube. This prevents the rectifier tube from operating unless an error voltage of at least 4½ volts is applied. This prevents any transient voltages or the diode-contact potential from actuating the control circuits or from interfering with the denergizing of the relay, and thereby provides stable operation of the difference amplifier.

A voltage of for instance, approximately 9 volts will appear at the junction of resistors 50 and 51. A portion of this voltage is picked off on potentiometer 55 and connected by a lead 56 to the grid 57 of amplifier tube 58 for the purpose of balancing the balanced amplifier arrangement of tubes 46 and 58.

The operation of the difference amplifier is as follows: When an error signal is applied to the difference amplifier, it is amplified in stage 42 rectified by rectifier 44 and applied to the grid 45 of amplifier 46 thereby causing an increase in plate current and decreasing the plate voltage of tube 46. The plate voltage of tube 58 will, on the other hand, increase since its plate current decreases due to the increase of cathode-grid potential of tube 58 which is caused by the increased voltage drop across the common cathode resistor 65 due to increased plate current of tube 46.

Therefore, the plate voltage of tubes 46 and 58 will differ and a current will flow through relay coil 60 thereby opening the relay circuit 61. The relay contacts are in series with a counter circuit as shown in Figure 1.

Many modifications and alterations to parts of the invention may be made without departing from the scope of the invention. For instance, a different number of secondaries, or a different number of groups of secondaries may be used, as well as equivalent difference amplifiers.

I claim:

1. Scoring apparatus comprising a master station input voltage means comprising a transformer having a plurality of secondaries each having a different value of voltage, and switching means adapted to connect selected ones of said secondaries in series, remote stations input variable voltage means, difference amplifier comparison means connected to said master station and said remote stations, and counting means connected to said difference amplifier means to indicate the score of each remote station.

2. Scoring apparatus comprising a master station input voltage means including a transformer having a plurality of secondaries each having a different value of voltage, switching means adapted to connect selected ones of said secondaries in series, remote stations input variable voltage means, difference amplifier means connecting said master station and said remote stations in bucking relation and counting means connected to each of said remote station means and adapted to count the correct no difference answers thereof.

3. Scoring means comprising a master station input voltage means including a transformer having a plurality of secondaries each having a different value of voltage, switching means adapted to connect selected ones of said secondaries in series, remote stations input variable signal means, difference voltage means connecting said master station and said remote station means in bucking relation, counting means connected to each of said remote station means and adapted to count the correct no difference answers thereof, said voltage comparison means comprising difference amplifier means and relay output means connected to said difference amplifiers.

References Cited in the file of this patent
UNITED STATES PATENTS

| | | |
|---|---|---|
| 2,562,179 | Dorf | July 31, 1951 |
| 2,602,586 | Davidson | July 8, 1952 |
| 2,654,163 | Reynolds | Oct. 6, 1953 |